Oct. 8, 1940.   W. E. KLAUER   2,216,782
CARRYING FRAME FOR SNOW REMOVING MECHANISM
Original Filed Aug. 12, 1936   8 Sheets—Sheet 2
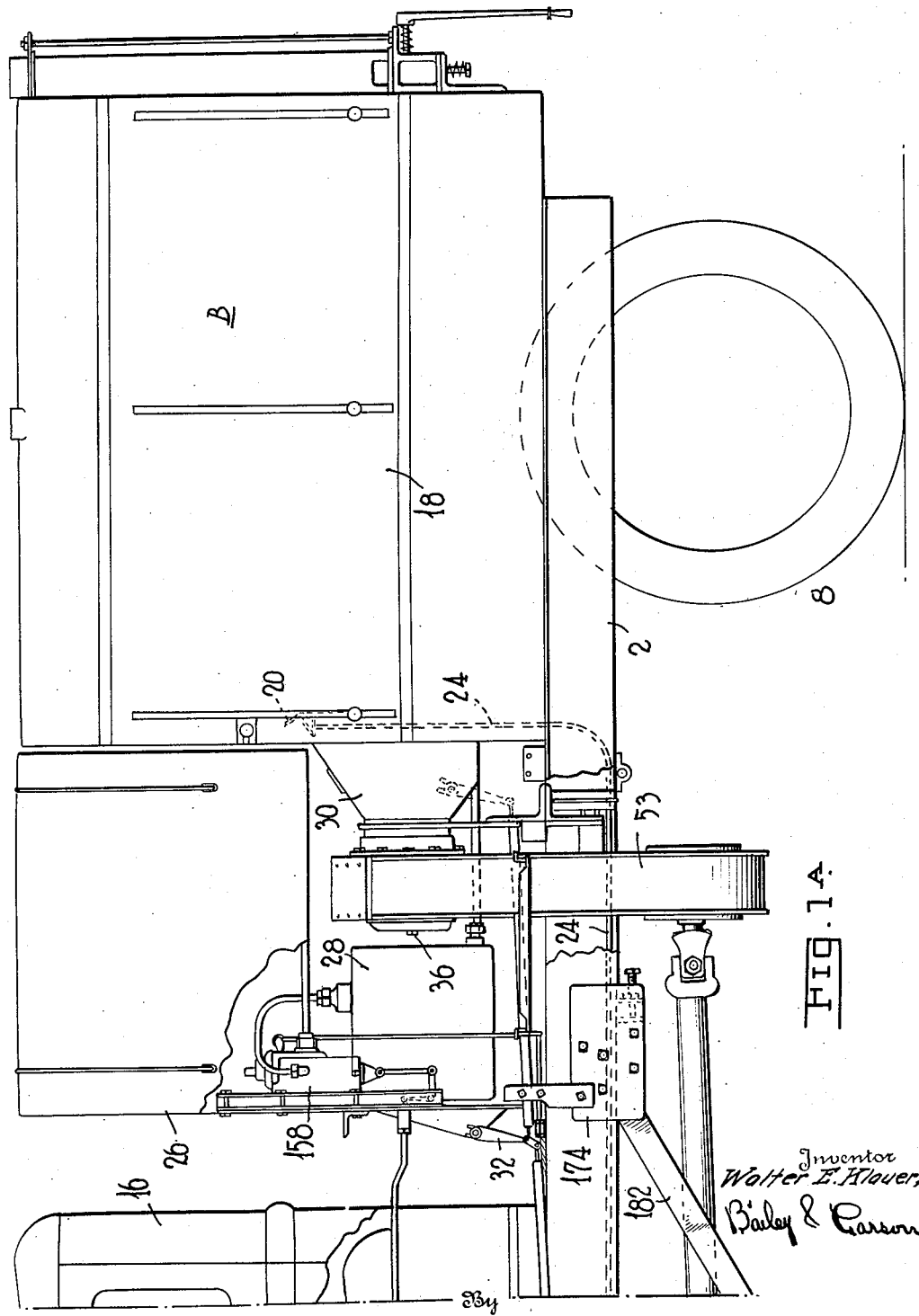

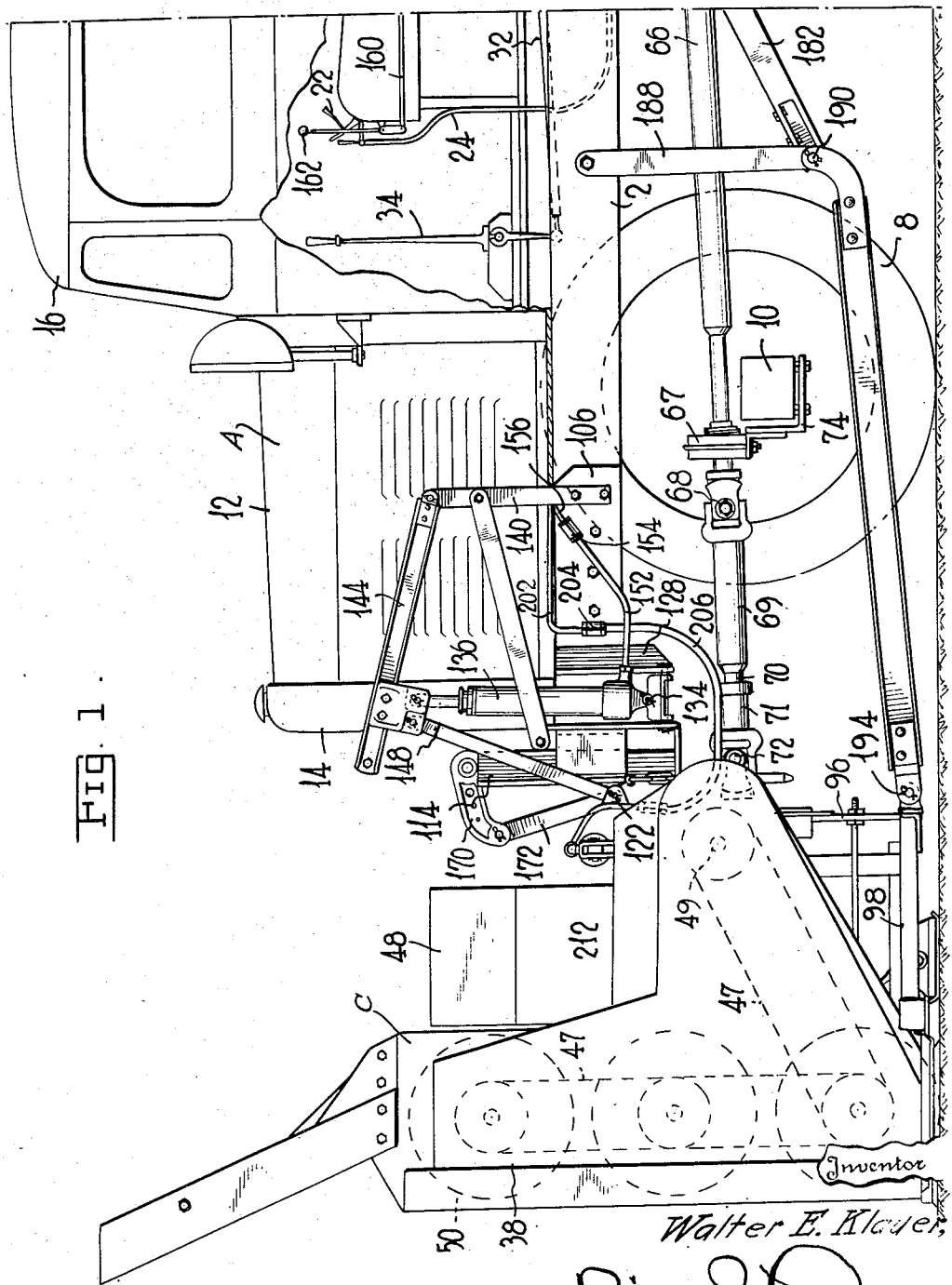

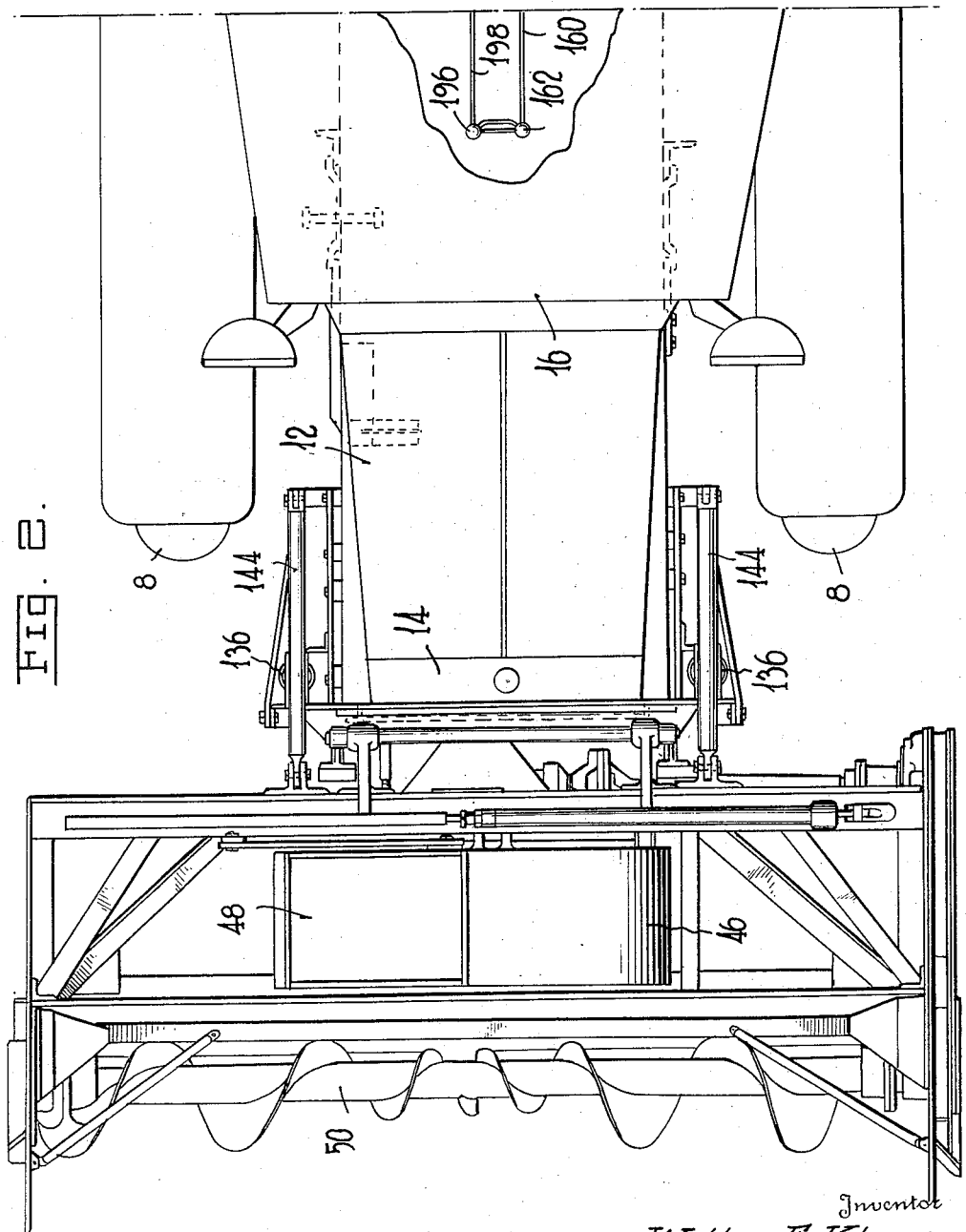

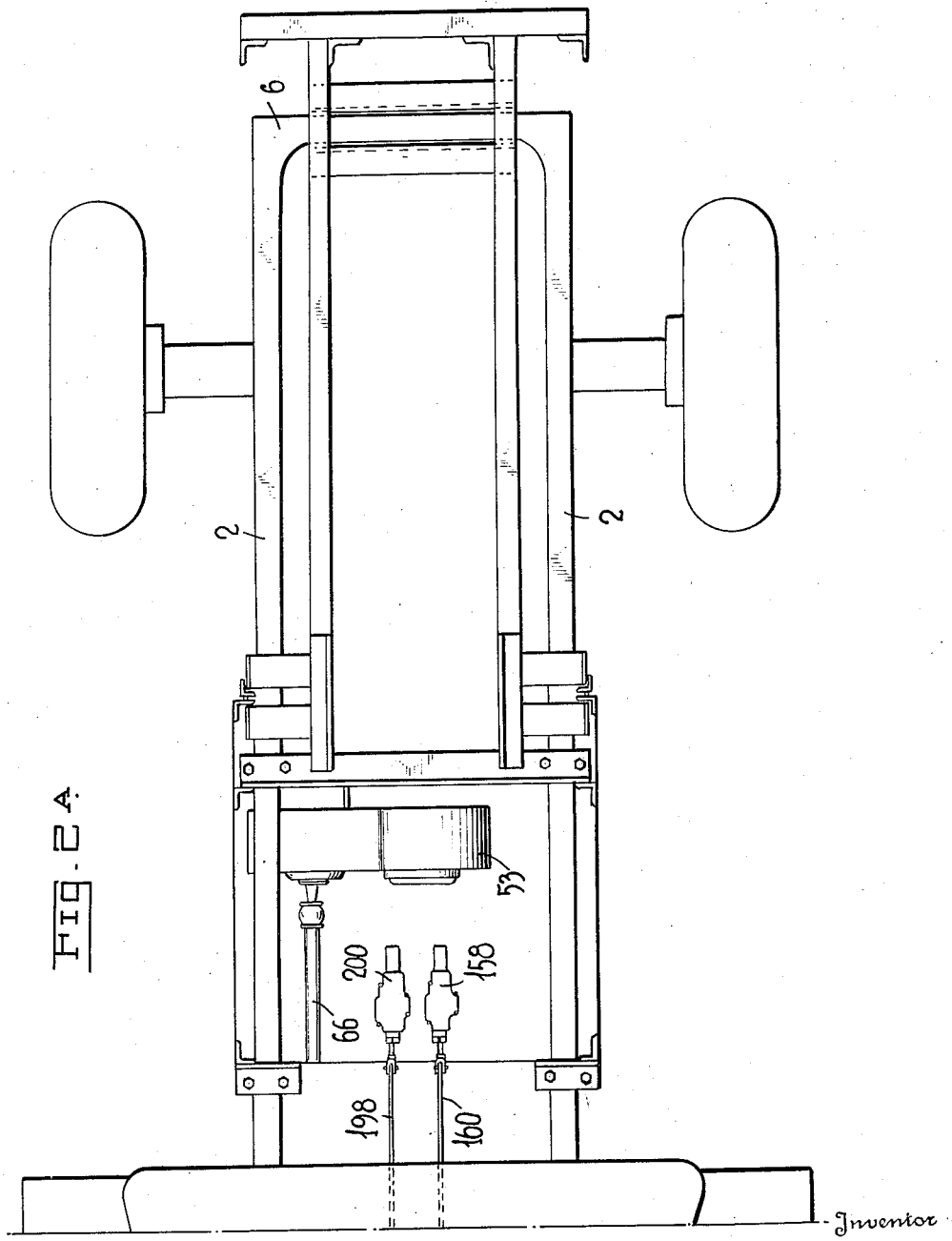

Oct. 8, 1940.　　　W. E. KLAUER　　　2,216,782
CARRYING FRAME FOR SNOW REMOVING MECHANISM
Original Filed Aug. 12, 1936　　8 Sheets-Sheet 5
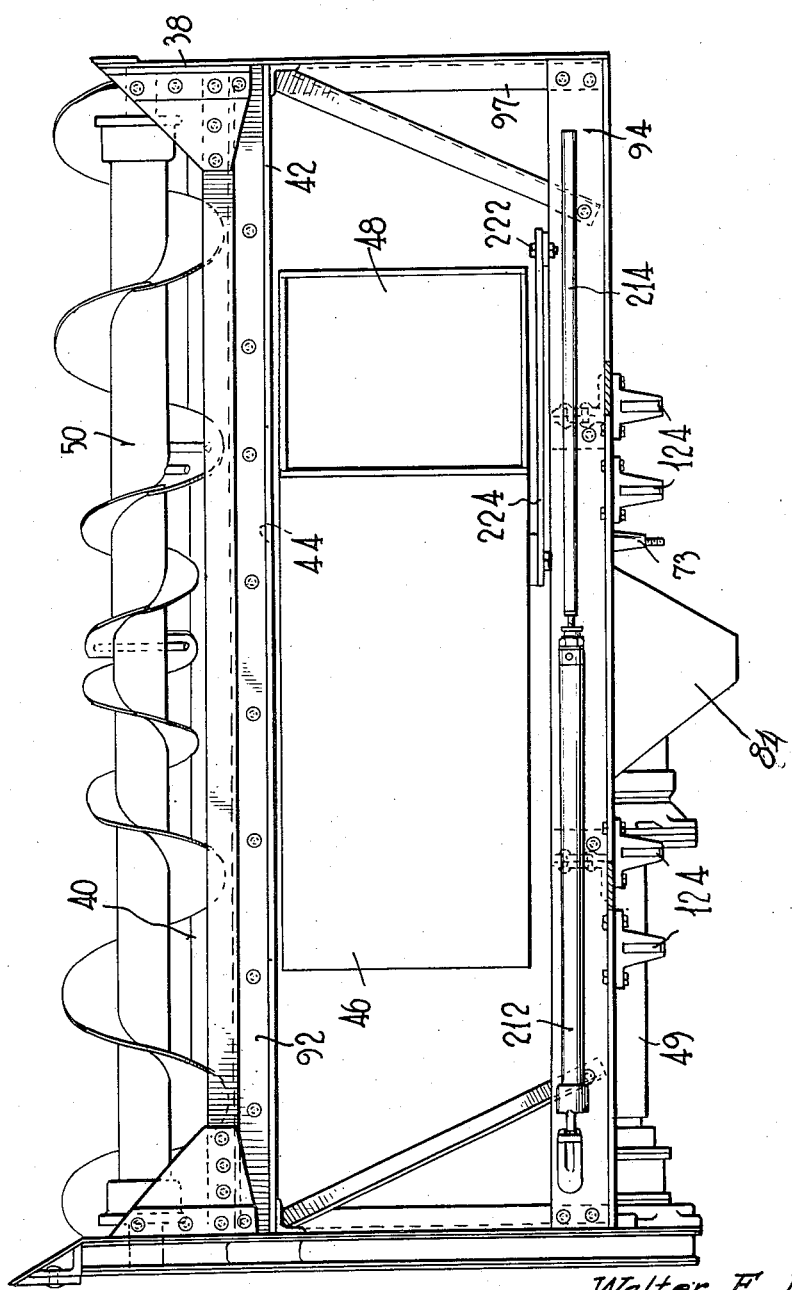
Inventor
Walter E. Klauer,
By Bailey & Carson
Attorneys

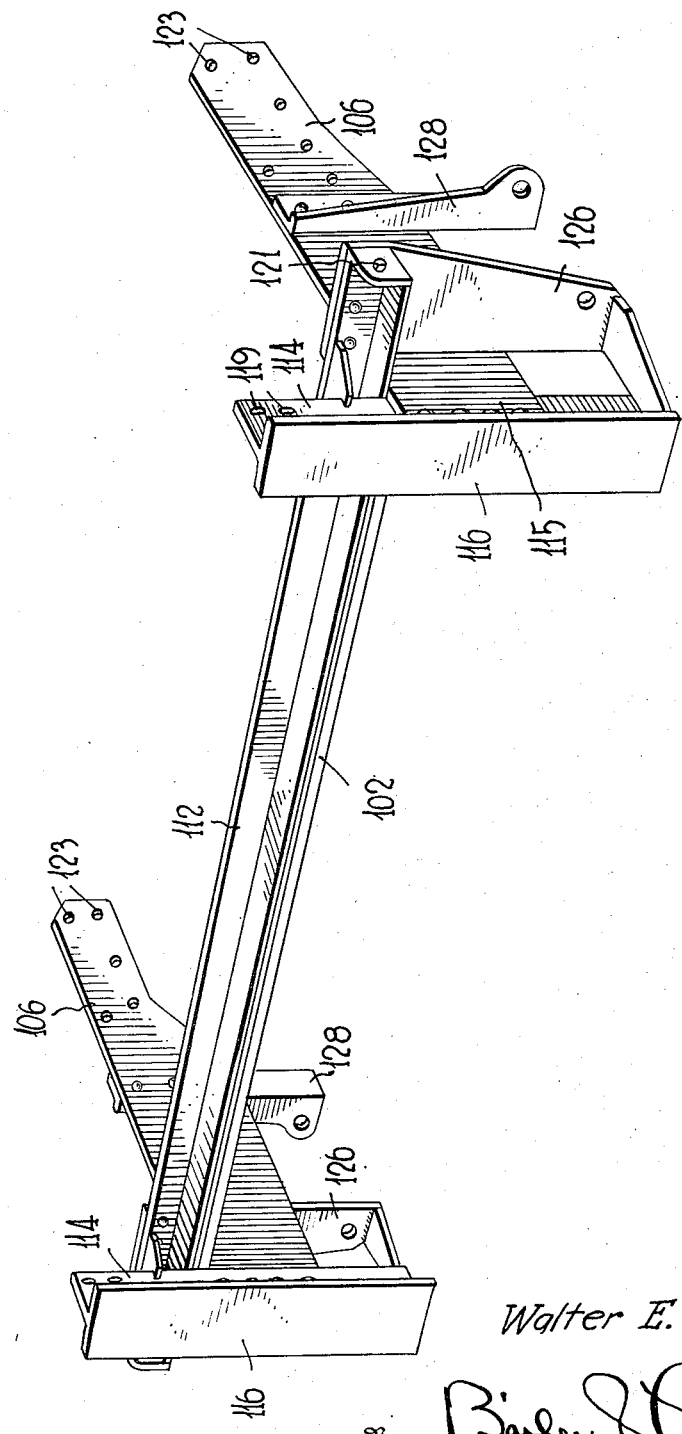

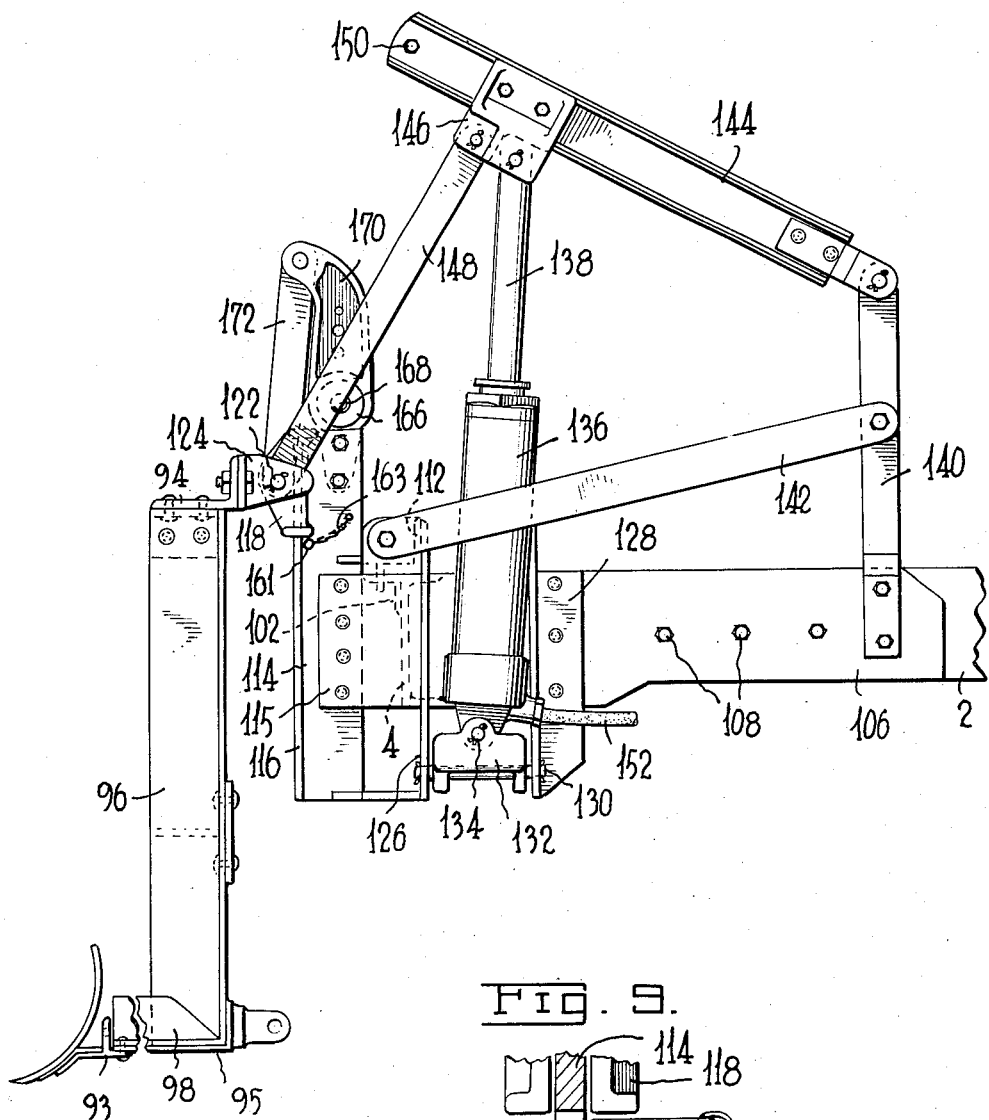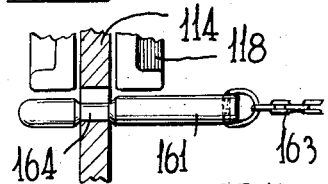

Oct. 8, 1940.   W. E. KLAUER   2,216,782
CARRYING FRAME FOR SNOW REMOVING MECHANISM
Original Filed Aug. 12, 1936   8 Sheets-Sheet 8
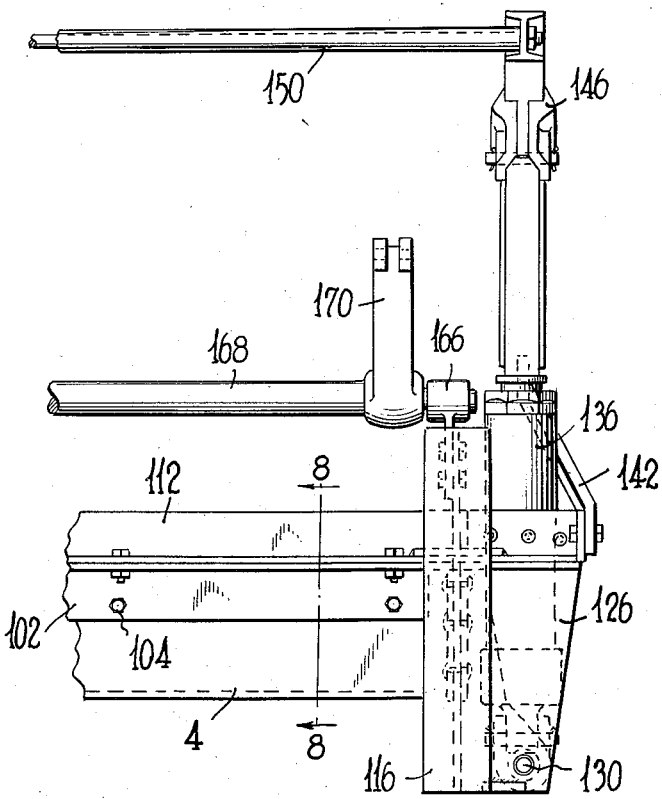
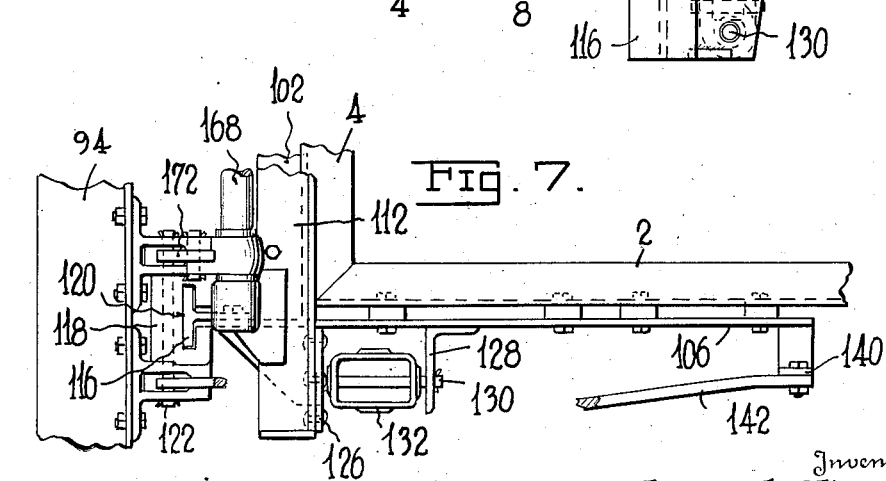
Inventor
Walter E. Klauer,
By Bailey & Carson
Attorneys Patented Oct. 8, 1940

2,216,782

UNITED STATES PATENT OFFICE 2,216,782

CARRYING FRAME FOR SNOW REMOVING MECHANISM

Walter E. Klauer, Dubuque, Iowa

Original application August 12, 1936, Serial No. 95,688, now Patent No. 2,144,311, dated January 17, 1939. Divided and this application August 12, 1936, Serial No. 95,694

5 Claims. (Cl. 37—43)

The present invention relates to carrying frames for snow removing mechanism and particularly to such mechanism adapted for use in removing snow from streets and highways. It is concerned more particularly with such mechanism which is carried by a motor truck.

This application is a division of my application S. N. 95,688, filed August 12, 1936, now Patent No. 2,144,311.

In the past, the usual practice in the production of snow removing mechanism has been to mount the same permanently on a special truck. Such an arrangement is comparatively expensive, and its expense is increased because it can be used only during a short period of the year. The advantage of the use of trucks as compared to tractors is that such devices can move easily from one place to another as required at a high rate of speed, which is almost a necessity.

The primary object of the present invention is to provide power driven snow removal mechanism of a practical and efficient type which is arranged so that it can be readily mounted on and removed from a truck. Both the snow remover and the power unit for driving the same are easily and readily demountable. In this manner, the mechanism may be applied to a standard truck, which is used during the snow season to carry the snow removing mechanism, and may be used during the remainder of the year for hauling purposes as a freight vehicle.

One of the special features by which this result is accomplished resides in a special frame which acts as a carrier for the snow remover and its lifting mechanism, and which is mountable as a unit on the front of a truck in such a manner that it rests on one of the truck chassis members and is supported directly thereby.

A primary object of the invention resides in the provision of a single unitary frame, which may be easily and readily secured to or removed from a truck or other vehicle, and which forms the sole support of the snow remover on the vehicle. The manufacture of such an arrangement is relatively simple, and in use it is of great assistance in providing for ready attachment and removal of the plow.

A special advantage of the invention resides in the fact that the frame includes members arranged to carry all the parts used in the manipulation of the snow remover, so that when provision is made for securing the frame to a vehicle it is unnecessary to provide other holes, brackets or the like on the vehicle for receiving guiding or lifting devices. More specifically, the frame includes a part of the guiding means, which permit the snow remover to move vertically with respect to the plow. Also it includes supports for hydraulic cylinders which raise the plow, and for a lifting mechanism through which these cylinders act. Means are also provided for supporting an equalizing mechanism.

Still another feature of the frame is that it includes a transverse member adapted to rest on the front cross chassis frame member, so that the weight of the snow remover is transmitted to the vehicle otherwise than by the mere shear strength of the bolts which hold the frame in place on the vehicle.

It is quite usual to have a snow remover mounted on the front of a vehicle in such a manner that it can be lifted or lowered either to pass over obstructions or to move at a given distance above the surface of the ground or road. In the past, however, and particularly with the rotary type of plow, to which my invention especially relates, the snow remover has been mounted in such a manner that it turns about an axis or pivot in its rising and falling movement. Such an arrangement tilts the snow remover either forward or backward, and throws it far out of line so that it does not act in its proper and intended manner. A further object of the present invention therefore is to provide a mounting for a snow remover on a vehicle such that it is capable of a substantially straight up and down movement without tilting. More especially I provide a specific mounting for giving this result. This mounting both acts a guide to keep the snow remover in vertical position, as a carrying mechanism for the snow remover, and also as a thrust resisting mechanism for imparting the force exerted on the plow by the resistance of the snow to the chassis of the vehicle.

Furthermore, the lifting mechanism for raising and lowering the snow remover is generally of a heavy and complicated nature. An object of the invention is to provide a simple lifting mechanism which is relatively light in weight and which is yet strong and effective. Also, the lifting arrangement is so designed as to avoid blocking the radiator of the truck. One of the principal features by which this result is accomplished resides in the fact that most of the parts of the lifting mechanism are under tension, and can thus be made in a simplified and considerably lightened form. Another important part of the invention is the arrangement of the lifting devices at opposite sides of the vehicle.

Furthermore, in vertically movable snow removers heretofore known there has been a considerable disadvantage in that the means for raising the two sides of the mechanism often do not work together and in synchronism. One side of such a device may rise as much as eight inches before the other side rises at all. Of course this often defeats the whole purpose of raising the snow remover, since instead of giving a level cut at a given height, a sloping cut is obtained. Furthermore, it causes considerable strain on the parts and thus reduces the life of the device.

Another object of the invention then is to provide an arrangement which will absolutely prevent one side of the snow remover from rising faster than the other, but will equalize at all times the motion of the two sides so that the snow remover is kept absolutely parallel to the road surface.

A further feature of the invention resides in an arrangement by which a rotary type of snow remover may be separated easily and quickly from the remainder of the device, and a plow of another type substituted therefor in such a manner that the second plow can be raised and lowered by the same arrangement which supports the rotary snow remover. More especially, I provide a device in which the removal of four pins is all that is necessary to take off the rotary plow and replace it by a push plow or other construction.

Further objects and advantages of the invention will appear more fully from the following description, particularly when taken in conjunction with the accompanying drawings which form a part thereof.

In the drawings:

Fig. 1 is a side elevation of a snow remover embodying my invention and shown as mounted on a truck.

Fig. 1a is a continuation of Fig. 1, showing the power unit on a truck.

Fig. 2 is a top plan view of the arrangement shown in Fig. 1.

Fig. 2a is a continuation of Fig. 2 showing in top plan view the arrangement of Fig. 1a, with the power unit removed.

Fig. 3 is a top plan view showing the snow remover frame.

Fig. 4 is a perspective view of the unitary frame.

Fig. 5 is a detail side elevation showing the lifting, guiding and equalizing mechanism.

Fig. 6 is a front view of one side of this mechanism with the snow remover disconnected.

Fig. 7 is a top plan view of one side of the mechanism shown in Fig. 5 with parts broken away.

Fig. 8 is a cross section on the line 8—8 of Fig. 6.

Fig. 9 is a detail view of the arrangement for holding the snow remover in raised position.

As shown in Fig. 1, the snow remover is mounted on a truck A of any standard type. This truck has a chassis consisting of longitudinal members 2, a front cross member 4 and a rear cross member 6. The chassis is mounted on wheels 8, supported by axles such as the front axle 10. The wheels, preferably the rear wheels, are driven by a motor mounted in the hood 12 and provided with a radiator 14. The truck also has a cab 16 of any suitable type.

Mounted on the rear end of the truck is the power unit B. The power unit is carried by a sub-frame. The power unit consists of a motor or engine 18 controlled by a throttle 20 which may be operated by a lever 22 inside the cab 16 through a flexible or Bowden cable 24. The unit B also includes a gasoline tank 26 for supplying fuel to the engine and a suitable pump for forcing a liquid such as oil under pressure into a supply tank 28. The motor drives a clutch which is mounted in a housing 30 and is controlled through a link and lever system 32 by a lever 34 in the cab of the truck. The clutch is adapted to couple and uncouple a shaft 36 to and from the motor 18.

C indicates in general the snow remover. It consists in the preferred form of a casing having side walls 38, a bottom wall and scraper blade 40 and a rear wall 42. An opening 44 in the rear wall 42 communicates with the interior of a fan casing 46 in which is mounted a fan for ejecting snow through the spout 48. Within the casing formed by walls 38, 40 and 42 are mounted three augers or conveyers 50 on horizontal vertically spaced axes. These augers are all driven, by a suitable chain drive mechanism 47 from a sprocket mounted on a shaft 49, to feed snow towards the center of the casing so that it can pass through the opening 44 into the fan casing 46.

The snow removing mechanism is driven through a shaft mechanism running underneath the truck. It is desirable to be able to vary the position of the back end of this driving shaft, so that its angular relation to the body of the truck may be changed. In this manner it is possible to avoid obstructions extending below the truck, and thus to apply the snow removing mechanism to trucks of varying types.

In order to be able to shift the rear end of the drive shaft while driving it all times from the power unit B, which is relatively fixed on the truck, the shaft driven by the clutch extends forwardly of the clutch casing 30. On the end of the clutch casing is mounted a casing 53, in such a manner that the casing is capable of turning with respect to the clutch housing 30. The whole casing 53 is oil-tight, so that the mechanism may run in oil, and is preferably formed of welded steel. At its lower end the casing 53 supports a stub shaft 57. Sprockets on the shafts are connected in driving relation by an endless chain.

With this construction the position of the shaft 57 may be adjusted transversely of the truck as shown in my Patent No. 2,144,311 while at the same time this shaft is always driven by the power unit when the clutch is engaged. Suitable means are provided to hold the casing in its adjusted positions. It is obvious that in this manner the casing 53 may be held in a given angular position.

Shaft 57 carries a universal joint 65 which drives a shaft section 66. Section 66 is mounted in a flexible or self-aligning bearing 67 which allows variation of the angular position of the shaft with respect to the bearing. In front of the bearing 67 is arranged a universal joint 68 which drives another shaft section 69. The front end 70 of shaft 69 is reduced in cross section and fits into a coupling member 71 in keyed relation thereto. The members 70 and 71 are slidable endwise with respect to each other. Member 71 is connected by a universal joint 72 to a shaft 73 which is fixed in the snow remover and drives the rotary augers and the fan thereof.

Various possible mountings may be used for the intermediate bearing 67. In the form shown, the bearing 67 is mounted through angle members 74 on the front axle 10 of the vehicle.

Shaft 73 through suitable gearing in box 81 drives the fan and the shaft 49.

The mounting of the snow remover on the truck will now be described.

The snow remover is carried by a frame having transverse front top and bottom members 92 and 93, transverse rear top and bottom members 94 and 95, top side members 97, vertical members 96, and horizontal bottom members 98 which support the ends of scraper 40 forming the bottom portion of the wall of the auger casing.

I provide a unitary carrying frame which may be easily applied to and removed from a truck for carrying the snow remover and the mechanism for manipulating the same. This frame is shown in Figs. 4 to 8.

The supporting and guiding unitary frame for the plow includes a front cross member 102 adapted to be secured by bolts 104 to the front cross piece 4 of the chassis and side plates 106 adapted to be secured by bolts 108 to the side frame members 2 of the chassis. The cross member 102 has secured thereto and above it another cross member 112 which extends out beyond the sides of the chassis frame. It will be noted (Fig. 8) that member 112 also extends rearwardly slightly beyond member 102, and that this extension rests on the top front chassis member 4. In this fashion the chassis member supports the weight of the snow remover directly and the whole load thereof is not carried by the bolts.

Both the members 102 and 112 are angle irons. The side members 106 extend forwardly of the chassis frame and of the cross member 102 and at their forward ends support integrally secured vertically arranged T-shaped rails having leg portions 114, riveted to the extensions 115 of the side plates, and cross portions or arms 116. Plates 126 are secured to and extend downwardly from the ends of the cross member 112, and angle members 128 are secured to the side pieces 106. The parts of this frame are preferably both riveted and welded together, so that the whole frame acts as a unit which may be secured bodily to the truck and will serve as the connection between the snow remover and the vehicle. The T-shaped rails extend upward above the cross member 112, and in their upper ends are provided with holes 119 for supporting the equalizing mechanism to be described below. The ends of member 112 are closed, and are provided with holes 121, which with holes 123 in the side pieces 106 provide for the attachment of a lifting frame hereafter to be described.

Guide blocks or slide members 118 are provided with T-shaped slots 120 which fit over the arms of the T rails and thus the blocks 118 are guided thereby for vertical sliding movement. Pins 122 pass through the blocks 118 and through the arms or brackets 124 secured on the cross member 94 of the plow frame, one of these brackets being arranged on each side of each block 118. Thus the plow frame is guided at both sides for straight up and down movement.

For raising and lowering the plow a special hydraulic arrangement is provided. Through the pairs of parallel plates 126 and 128 are inserted pins 130 on which are pivotally mounted blocks 132 supporting transverse pins 134. The pins 134 provide pivots for hydraulic cylinders 136, one on each side of the snow remover, in which are slidably arranged pistons 138.

Secured to the holes 123 in frame side members 106 at points to the rear of the front cross chassis member are uprights 140, which are braced by links 142 each connected at one end to the uprights and at the other end to the holes 121 in the ends of the transverse member 112. The uprights and links thus form lifting frames which support the arms used in raising the snow remover. Pivoted to the upper end of the uprights are beams or links 144, preferably I beams. These beams carry blocks 146 to which are pivoted the pistons 138 and links 148 which at their other ends are traversed by the pins 122 in the neighborhood of the outer brackets 124.

Of course one of these lifting devices is provided on each side of the plow, and the other ends of the beams 144 are connected by a spacer and bracing rod 150. It will be noted that this provides a simple and convenient mechanism for raising and lowering the snow remover without blocking in any manner the front of the radiator of the truck. This is a special advantage since when such trucks are in operation there is danger that the engine will become overheated if the radiator is blocked.

The hydraulic cylinders 136 are supplied with fluid under pressure through flexible pipes 152, releasable connections 154 and pipes 156. Pipes 156 are connected to a valve chest 158 in which is a valve controlled by linkage system 160 through a handle 162 located in the cab of the truck. The details of this valve form no part of the invention, and it is sufficient to state that when the valve is moved to one position the piston will be caused to rise, while in the other position it will drop. Fluid under pressure is supplied to the valve chest 158 from the tank 28.

In order to take the load off of this hydraulic system when the truck is being driven over long distances and the snow remover is not in use, I may provide pins 161 adapted to pass through the holes in the T rails 114 just below the blocks 118 when the same are in raised position. These pins may be secured to the T rails by chains 163 so that they will not be lost. Preferably the pins have pointed ends and annular grooves 164 at points spaced from the ends, so that the pressure caused by the weight of the plow exerted through engagement of blocks 118 with the ends of the pins will cause the grooves 164 to engage the sides of the openings in the rails 114 and thus prevent the pins from slipping out of position even though subjected to the shocks caused by inequalities in the road.

Additional mechanism is provided to make certain that one side of the plow does not rise faster than the other, and to insure leveling of the snow remover at all times. Brackets 166 secured to the holes 119 in the upper ends of the T-shaped rails 114 support a shaft 168 which extends across the front of the snow remover. At each side of the snow remover are arranged levers 170 both keyed to the shaft. Links 172 are each pivoted at one end to one of said levers 170 and at the other ends engage the pins 122. This arrangement prevents one side of the plow from moving faster or slower than the other, since any motion imparted to one side will be equalized on the other side through the links, levers and shaft. It will be noted that when the plow is in its raised position, shown in Fig. 5, the levers 170 are substantially upright, and thus also help to take the load off the hydraulic mechanism.

From the above description it will be seen that the single unitary frame provides support for the guiding means for the plow, the lifting means including both the lifting frame and the cylinders, and the equalizing means. Therefore, once the frame is secured to a vehicle, it is a simple matter to attach to the vehicle through the frame all the mechanism necessary for proper movement and manipulation of the snow remover, without in any way modifying the vehicle structure to receive these parts.

In order to brace the bottom of the plow against backward tilting because of the pressure of snow, a special type of thrust bar is provided. A plate 174 is bolted or otherwise suitably secured to the chassis frame. A bracing arm 182 extending diagonally downward from the plate has its end bent over into a parallel position. Means are provided so that the position of the bracer may be adjusted longitudinally of the truck, and it may be locked in any adjusted position.

A tension member 188 is pivoted on one of the longitudinal chassis frame members and extends substantially vertically downwardly. The lower end is connected by a pin 190 to the end of a bracer 182. Also pivoted on the same pin is a thrust bar 192 consisting of an I beam. The front end of this thrust bar is secured by a pin 194 to the lower corner of the plow supporting frame. Obviously one of these bars is arranged on each side of the snow remover.

The fan casing 46 is mounted to rotate for example in the manner shown in the Wandscheer Patent No. 1,886,069. It is important to be able to shift the position of the spout 48 from one side to the other of the snow remover so that the direction of the stream of snow may be changed. For this purpose, I provide a hydraulic device for controlling the position of the fan casing. A lever 196 in the cab of the truck through a lever and linkage system 198 controls a valve in a valve box 200, supplied with fluid under pressure from the reservoir 28. Pipes 202 extend from this reservoir to the front of the truck and are connected through couplings 204 to flexible hoses 206.

Mounted on the cross member 94 is a bracket which carries a pin supporting one end of a hydraulic cylinder 212. The member 94 also supports a pair of spaced U-shaped rails 214 between which slides a cross head. A piston slidable in the cylinder 212 has an extension which is connected by a pin to the cross head. A pin 222 carried by the cross head forms a pivot for one end of a link 224 which at its other end engages a pivot pin fixed in the rear wall of the fan casing. Pipes 206 on opposite sides of the plow are connected respectively to pipes opening into opposite ends of the cylinder 212. It is evident that by admitting fluid under pressure to one side or the other of the piston the cross will be caused to move and will shift the spout 48 from one side to the other.

While I have described herein some embodiments of my invention, I wish it to be understood that I do not intend to limit myself thereby except within the scope of the appended claims.

What I claim is:

1. A unitary frame adapted to support a snow removing mechanism on a vehicle, said frame including a transverse member, side members extending rearwardly from said transverse member, said side members also extending in front of the transverse member, vertically arranged rails mounted on the forward extensions of said side members, means secured to the transverse member and to said side members to receive fluid pressure lifting mechanism for the snow remover, said rails extending above the transverse member and providing means to support a mechanism for equalizing the movement of the two sides of the snow removing mechanism.

2. A unitary frame adapted to support a snow removing mechanism on a vehicle, said frame including a transverse member, side members extending rearwardly from said transverse member, said side members also extending in front of the transverse member, vertically arranged rails mounted on the forward extensions of said side members, said rails extending above the transverse member and providing means to support a mechanism for equalizing the movement of the two sides of the snow removing machanism.

3. A unitary frame adapted to support a snow removing mechanism on a vehicle, said frame including a transverse member, side members extending rearwardly from said transverse member, plates secured to the ends of said transverse member and extending downwardly therefrom, angle members secured to said side members to the rear of said transverse member, said last plates and angle members forming a support adapted to receive fluid pressure lifting mechanism for the snow remover.

4. A unitary frame adapted to support a snow removing mechanism on a vehicle, said frame including a transverse member, side members extending rearwardly from said transverse member, vertically arranged rails mounted on the forward extensions of said side members, plates secured to the ends of said transverse member and extending downwardly therefrom, angle members secured to said side members to the rear of said transverse members, said last plates and angle members forming a support adapted to receive fluid pressure lifting mechanism for the snow remover, said rails extending above the transverse member and providing means to support a mechanism for equalizing the movement of the two sides of the snow removing mechanism.

5. A unitary frame adapted to support a snow removing mechanism on a vehicle, said frame including transverse angle members secured together, the upper angle member extending to the rear of the lower angle member to form a shoulder adapted to rest on the chassis frame of a vehicle so as to support the frame, and also extending laterally beyond the ends of the lower angle member, side members extending rearwardly from said transverse members at points located at substantially the ends of the lower angle member, said side members also extending in front of the transverse members, vertically arranged T-shaped rails mounted on the forward extensions of said side members, plates secured to the ends of said upper transverse member and extending downwardly therefrom, angle members secured to said side members to the rear of said transverse members, said last plates and angle members forming a support adapted to receive fluid pressure lifting mechanism for the snow remover, the ends of said upper angle member being closed and providing means for the attachment of a lifting frame, said T-shaped rails extending above the upper angle member and providing means to support a mechanism for equalizing the movement of the two sides of the snow removing mechanism.

WALTER E. KLAUER.